(12) United States Patent
Ogata

(10) Patent No.: US 10,118,640 B2
(45) Date of Patent: Nov. 6, 2018

(54) DAMPER APPARATUS AND STEERING SYSTEM

(71) Applicant: JTEKT CORPORATION, Osaka-shi, Osaka (JP)

(72) Inventor: Toshiaki Ogata, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 5 days.

(21) Appl. No.: 15/454,312

(22) Filed: Mar. 9, 2017

(65) Prior Publication Data
US 2017/0267282 A1   Sep. 21, 2017

(30) Foreign Application Priority Data

Mar. 15, 2016  (JP) ................. 2016-051324

(51) Int. Cl.
| | | |
|---|---|---|
| *B62D 3/12* | (2006.01) | |
| *B62D 7/22* | (2006.01) | |
| *F16F 3/10* | (2006.01) | |
| *F16F 15/08* | (2006.01) | |
| *B62D 7/20* | (2006.01) | |

(52) U.S. Cl.
CPC ............. *B62D 7/228* (2013.01); *B62D 3/12* (2013.01); *F16F 3/10* (2013.01); *F16F 15/085* (2013.01); *B62D 7/20* (2013.01)

(58) Field of Classification Search
CPC .......... B62D 7/228; B62D 7/20; B62D 7/163; B62D 3/10; B62D 3/12; F16F 15/085; F16F 3/10
See application file for complete search history.

(56) References Cited

U.S. PATENT DOCUMENTS

| | | | |
|---|---|---|---|
| 5,788,009 A | 8/1998 | Lee | |
| 9,156,493 B1 * | 10/2015 | Kimijima | ................. B62D 3/12 |

(Continued)

FOREIGN PATENT DOCUMENTS

| | | |
|---|---|---|
| DE | 10 2007 012655 A1 | 7/2008 |
| DE | 10 2009 027196 A1 | 12/2010 |

(Continued)

OTHER PUBLICATIONS

Aug. 28, 2017 Extended European Search Report issued in International Patent Application No. 17160884.7.

*Primary Examiner* — Drew J Brown
(74) *Attorney, Agent, or Firm* — Oliff PLC

(57) ABSTRACT

A damper apparatus includes a shock-absorbing member configured to absorb a shock while restricting movement of a shaft relative to a housing. The shock-absorbing member includes a shock-receiving member configured to come into contact with one member, which is one of a large-diameter portion of the shaft and a restriction portion of the housing, and a pre-compression spring disposed between the other member, which is the other of the large-diameter portion and the restriction portion, and the shock-receiving member in a state where the pre-compression spring is compressed in advance in an axial direction. The pre-compression spring is configured to urge the one member in the axial direction via the shock-receiving member when the large-diameter portion is relatively moved toward the restriction portion beyond a prescribed position.

7 Claims, 4 Drawing Sheets

(56) References Cited

U.S. PATENT DOCUMENTS

| | | | | |
|---|---|---|---|---|
| 2014/0137692 A1* | 5/2014 | Ohashi | ................... | B62D 3/12 |
| | | | | 74/492 |
| 2015/0151787 A1 | 6/2015 | Ohashi | | |
| 2015/0274192 A1 | 10/2015 | Enomoto | | |
| 2016/0176437 A1* | 6/2016 | Fujita | .................. | B62D 5/0433 |
| | | | | 180/444 |
| 2017/0267277 A1* | 9/2017 | Ohashi | .................. | B62D 3/123 |

FOREIGN PATENT DOCUMENTS

| | | |
|---|---|---|
| DE | 10 2010 061168 A1 | 6/2012 |
| EP | 2 427 359 B1 | 4/2015 |
| JP | 2012-035713 A | 2/2012 |
| JP | 2015-128981 A | 7/2015 |
| WO | 2015/124466 A1 | 8/2015 |

* cited by examiner

DAMPER APPARATUS AND STEERING SYSTEM

INCORPORATION BY REFERENCE

The disclosure of Japanese Patent Application No. 2016-051324 filed on Mar. 15, 2016 including the specification, drawings and abstract is incorporated herein by reference in its entirety.

BACKGROUND OF THE INVENTION

1. Field of the Invention

The invention relates to a damper apparatus and a steering system.

2. Description of Related Art

A damper apparatus is applied to, for example, a steering system of a vehicle. The steering system changes the orientation of steered wheels of the vehicle by causing an axial reciprocating motion of a shaft connected to the steered wheels via tie rods. When the shaft is moved to an end of its movable range, end contact for physically restricting a movement of the shaft relative to a housing occurs. As described in each of Japanese Patent Application Publication No. 2012-35713 (JP 2012-35713 A) and Japanese Patent Application Publication No. 2015-128981 (JP 2015-128981 A), a damper apparatus absorbs a shock generated due to end contact, using a shock-absorbing member disposed between a shaft and a housing in the axial direction.

An elastic body having axial elasticity is used as the shock-absorbing member of the damper apparatus. The shock-absorbing member of the damper apparatus is configured such that an elastic force corresponding to a moving distance (stroke) of the shaft after occurrence of end contact is applied to the shaft. In order to restrict the movement of the shaft to a prescribed stroke or less even when an excessive axial force is input into the shaft, a spring constant of the elastic body is preferably set to be higher. However, the shock absorbing property may deteriorate as the spring constant of the elastic body is set to be higher. This causes a possibility that the shaft and an internal mechanism of the steering system will be suddenly stopped due to end contact and a high load will be applied to the internal mechanism.

In some cases, the movable range of the shaft corresponding to a maximum steered angle is set in advance so as to prevent interference between the steered wheel and a tire house cover and so forth in the steering system. However, for example, as the elastic body of the shock-absorbing member in the damper apparatus deteriorates over time, the axial position at which end contact occurs changes, and, as a result, the movable range of the shaft expands. This causes a possibility that interference between the steered wheel and the tire house cover and so forth will occur. In view of this, the damper apparatus and the steering system are required to appropriately maintain the movable range of the shaft.

SUMMARY OF THE INVENTION

One object of the invention is to provide a damper apparatus and a steering system configured to appropriately maintain a movable range of a shaft while appropriately maintaining a shock absorbing property.

A damper apparatus according to an aspect of the invention includes: a shaft having a shaft portion and a large-diameter portion having a diameter larger than a diameter of the shaft portion; a housing through which the shaft extends so as to be movable relative to the housing in an axial direction, the housing having a tubular shape, and the housing having a restriction portion at a position at which the restriction portion faces the large-diameter portion in the axial direction; and a shock-absorbing member disposed between the large-diameter portion and the restriction portion, the shock-absorbing member being configured to restrict movement of the shaft relative to the housing and absorb a shock generated due to the restriction when the shaft is moved to an end of a movable range relative to the housing. The shock-absorbing member includes a shock-receiving member and a pre-compression spring. The shock-receiving member is configured to come into contact with one member when the large-diameter portion is moved to a prescribed position in the axial direction relative to the restriction portion. The one member is one of the large-diameter portion and the restriction portion. The pre-compression spring is a spring having elasticity in the axial direction. The pre-compression spring is disposed between the shock-receiving member and the other member in a state where the pre-compression spring is compressed in advance in the axial direction. The other member is the other one of the large-diameter portion and the restriction portion. The pre-compression spring is configured to urge the one member in the axial direction via the shock-receiving member when the large-diameter portion is relatively moved toward the restriction portion beyond the prescribed position.

With the damper apparatus according to the above aspect, the pre-compression spring constituting the shock-absorbing member is disposed in a state where the pre-compression spring is compressed in advance by a prescribed load, and the shock-receiving member is maintained in a state where the shock-receiving member is constantly urged toward the one member. Thus, when an axial load applied to the damper apparatus is lower than a prescribed load for compressing the pre-compression spring, displacement of the shock-receiving member in the axial direction is restricted by an elastic force of the pre-compression spring. As a result, the axial position at which end contact occurs is prevented from varying, and the movable range of the shaft is appropriately maintained. When the large-diameter portion of the shaft is relatively moved toward the restriction portion beyond the prescribed position, that is, when a load higher than a prescribed load is applied to the damper apparatus, the pre-compression spring of the shock-absorbing member urges the one member in the axial direction via the shock-receiving member. At this time, the one member is urged by an elastic force corresponding to the length to which the pre-compression spring is compressed in advance, in addition to an elastic force corresponding to a stroke of the shaft after occurrence of the end contact. With the above-described configuration, it is possible to reliably restrict movement of the shaft while appropriately maintaining the shock absorbing property, by appropriately adjusting the spring constant and the pre-compressed amount of the pre-compression spring.

A steering system according to another aspect of the invention includes the damper apparatus. The shaft constitutes a steered shaft connected at respective end portions to steered wheels via tie rods. The steered shaft is configured to make a reciprocating motion in an axial direction to steer the steered wheels. The shaft is oscillatably connected at the large-diameter portion to each of the tie rods. The steered shaft is accommodated in the housing.

In the steering system, the movable range of the shaft needs to be set in advance such that no interference between the steered wheel and a tire house cover and so forth occurs, and the movable range is required not to vary over time. In some cases, an excessive axial force is input into the steered shaft of the steering system due to, for example, a collision of the steered wheel with a curbstone. Thus, movement of the shaft is required to be reliably restricted. In the steering system according to the above aspect, the movable range of the steered shaft is appropriately maintained, and high shock absorbing property is exhibited.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a damper apparatus and a steering system according to the invention will be described with reference to the accompanying drawings. In a present embodiment, a case where the damper apparatus is applied to the steering system of a vehicle will be described by way of example.

Figure 1:
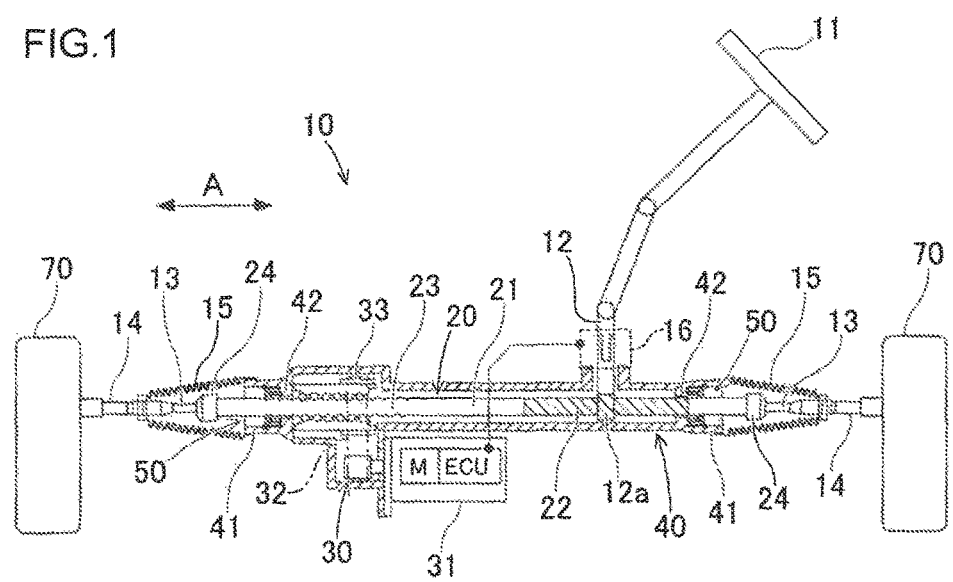
FIG. 1 is a schematic view illustrating the entirety of a steering system including a damper apparatus.

A steering system 10 changes the orientation of steered wheels 70 by causing a reciprocating motion of a steered shaft 20 in an axial direction A (a right-left direction in FIG. 1). The steered shaft 20 is connected to the steered wheels 70 of a vehicle. As illustrated in FIG. 1, the steering system 10 includes a steering wheel 11, a steering shaft 12, ball studs 13, tie rods 14, boots 15, a torque detector 16, the steered shaft 20, a steering assist mechanism 30, a housing 40, and damper apparatuses 50.

The steering wheel 11 is fixed to one end portion of the steering shaft 12, and is rotatably supported in a vehicle cabin. The steering shaft 12 transmits torque applied to the steering wheel 11 through an operation performed by a driver, to the steered shaft 20. A pinion 12a that constitutes a rack-and-pinion mechanism is provided at the other end portion of the steering shaft 12. The other end portion of the steering shaft 12 is close to the steered shaft 20.

The steered shaft 20 has a shaft portion 21 extending in the axial direction A. The shaft portion 21 is supported by the housing 40 such that the shaft portion 21 can make a linear reciprocating motion along the axial direction A. The shaft portion 21 is provided with a rack 22. The rack 22 is meshed with the pinion 12a of the steering shaft 12 to constitute the rack-and-pinion mechanism together with the pinion 12a. In the rack-and-pinion mechanism, a maximum axial force that can be transmitted between the steering shaft 12 and the steered shaft 20 is set based on, for example, the intended use of the steering system 10.

The shaft portion 21 is provided with a ball screw portion 23 disposed at a position apart from the rack 22. The ball screw portion 23 constitutes a ball screw mechanism together with a nut 33 of the steering assist mechanism 30 (described later in detail), and a steering assist force is transmitted to the ball screw portion 23 by the steering assist mechanism 30. The steered shaft 20 has large-diameter portions 24 disposed at respective ends of the shaft portion 21. Each large-diameter portion 24 is larger in diameter than the shaft portion 21. One end portion of each ball stud 13 is oscillatably supported by a corresponding one of the large-diameter portions 24. The steered shaft 20 constitutes the damper apparatus 50 (described later in detail).

Each ball stud 13 constitutes a ball joint together with a corresponding one of the large-diameter portions 24 of the steered shaft 20. The other end portion of each ball stud 13, which is close to the steered wheel 70, is connected to a corresponding one of the tie rods 14. A distal end of each tie rod 14 is connected to a knuckle (not illustrated) to which the steered wheel 70 is assembled. The boots 15 are expandable and contractible in the axial direction A. One end portion of each boot 15 is fixed to an end portion of the housing 40 and the other end portion of the boot 15 is fixed to the vicinity of the other end portion of the ball stud 13 to keep the inside of the boot 15 airtight. The torque detector 16 detects a torque applied to the steering shaft 12 based on a torsion amount of the steering shaft 12.

The steering assist mechanism 30 is a mechanism configured to apply a steering assist force to the steered shaft 20, by using a motor M as a driving source. The steering assist mechanism 30 includes a case 31, a driving force transmission mechanism 32, and the nut 33. The case 31 accommodates the motor M, and an electronic control unit (ECU) configured to drive the motor M. Based on an output signal from the torque detector 16, the ECU determines a steering assist torque and controls the output of the motor M.

The driving force transmission mechanism 32 includes a driving pulley disposed on an output shaft of the motor M, a driven pulley disposed on an outer periphery of the steered shaft 20, and a toothed belt looped over the driving pulley and the driven pulley. In the driving force transmission mechanism 32, a rotary driving force generated by the motor M is transmitted between the driving pulley and the driven pulley via the toothed belt. The nut 33 is screwed to the ball screw portion 23 of the steered shaft 20 via a plurality of balls. The nut 33 constitutes the ball screw mechanism together with the ball screw portion 23 of the steered shaft 20. The nut 33 is fixed so as to rotate together with the driven pulley of the driving force transmission mechanism 32 in an integrated manner.

With the above-described configuration, the steering assist mechanism 30 controls driving of the motor M based on an output signal from the torque detector 16. The output signal from the torque detector 16 varies depending on an operation of the steering wheel 11. The driving force output from the output shaft of the motor M is transmitted to the nut 33 via the driving force transmission mechanism 32. As the nut 33 constituting the ball screw mechanism rotates, the ball screw portion 23 of the steered shaft 20 is moved in the axial direction A via the balls. Thus, a steering assist force in the axial direction A is transmitted to the steered shaft 20.

The housing 40 is a fixed member that is fixed to the vehicle. The housing 40 has a tubular shape. The steered shaft 20 extends through the housing 40 so as to be movable relative to the housing 40 in the axial direction A. The housing 40 has large-diameter-portion accommodating portions 41, restriction portions 42, annular grooves 43, and snap-ring grooves 44. Each large-diameter-portion accommodating portion 41 has a cylindrical shape. When the steered shaft 20 is moved to a prescribed position Pr in the axial direction A, the large-diameter portion 24 of the steered shaft 20 is accommodated radially inward of the large-diameter-portion accommodating portion 41 (see FIG. 2).

Each restriction portion 42 is provided at a position at which the restriction portion 42 faces a corresponding one of the large-diameter portions 24 of the steered shaft 20 in the axial direction A. The bore diameter of the restriction portion 42 is smaller than the outside diameter of the large-diameter portion 24, and is larger than each of the diameter of the shaft portion 21 and the diameter of the ball screw portion 23. The restriction portion 42 has a restriction surface 42a that faces an end surface 24a of the large-diameter portion 24 in the axial direction A. The restriction surface 42a of the restriction portion 42 physically restricts an end of a movable range of the steered shaft 20 via a shock-absorbing member 60 disposed between the restriction surface 42a of the restriction portion 42 and the end surfaces 24a of the large-diameter portions 24. The shock-absorbing member 60 constitutes the damper apparatus 50 (described later in detail).

The annular groove 43 and the snap-ring groove 44 are provided in an inner peripheral surface of each large-diameter-portion accommodating portion 41. The annular groove 43 is engaged with an annular protrusion provided on an outer peripheral surface of an elastic body 62 of each shock-absorbing member 60. The snap-ring groove 44 is engaged with a snap ring 51 that is provided after the shock-absorbing member 60 is disposed at a prescribed position of the large-diameter-portion accommodating portion 41.

When the steered shaft 20 is moved to the prescribed position Pr in the axial direction A relative to the housing 40 and end contact for physically restricting relative movement of the steered shaft 20 occurs, the damper apparatus 50 absorbs a shock generated due to the end contact by using the shock-absorbing member 60 disposed between the steered shaft 20 and the housing 40 in the axial direction A. Specifically, end contact occurs when the end surface 24a of the large-diameter portion 24 of the steered shaft 20 is moved to the prescribed position Pr in the axial direction A, at which the end surface 24a of the large-diameter portion 24 comes into contact with a shock-receiving member 61 of the shock-absorbing member 60 disposed in the housing 40. The detailed configuration of the damper apparatus 50 will be described below.

With the steering system 10 having the above-described configuration, when the steering wheel 11 is operated by a driver, the steering shaft 12 is rotated by a torque generated by the operation. The rotation of the steering shaft 12 is converted into a linear motion of the steered shaft 20 by the pinion 12a and the rack 22. A steering assist force corresponding to a torsion amount of the steering shaft 12 is applied to the steered shaft 20 by the steering assist mechanism 30. Thus, the steered shaft 20 is moved along the axial direction A, and the steered wheels 70 are steered via the ball studs 13 and the tie rods 14.

The detailed configuration of the damper apparatus 50 will be described with reference to FIG. 1 to FIG. 4. When the steered shaft 20 is moved to the end of the movable range and end contact occurs, the damper apparatus 50 absorbs a shock generated due to the end contact while restricting movement of the steered shaft 20. The movable range of the steered shaft 20 corresponds to a maximum steered angle of the steered wheels 70, and is set in advance so as to fall within a prescribed range such that the steered wheel 70 does not interfere with a tire house cover and so forth. End contact occurs when the steered shaft 20 is moved in the axial direction A during abnormal steering due to, for example, a collision of the steered wheel 70 with an obstacle, or during normal steering due to a normal operation performed by a driver. The end contact during the normal steering means end contact that occurs during stationary steering (i.e., dry steering) in which a driver turns the steering wheel 11 while the vehicle is stationary, and end contact that occurs during steering in which a driver turns the steering wheel 11 while the vehicle is traveling at a low speed.

Figure 2:
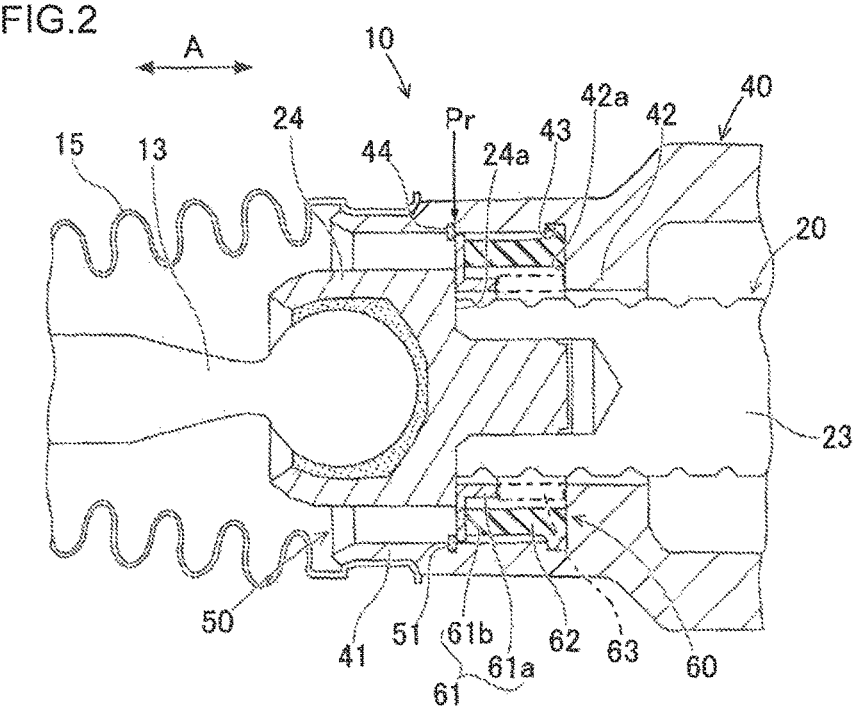
FIG. 2 is a sectional view illustrating the configuration of the damper apparatus in FIG. 1.

In the present embodiment, the damper apparatuses 50 are disposed at two locations of respective end portions of the steered shaft 20 (i.e., one of the damper apparatuses 50 is disposed at one end portion of the steered shaft 20, and the other one of the damper apparatuses 50 is disposed at the other end portion of the steered shaft 20). The damper apparatuses 50 having the same configuration are disposed such that the configurations of the damper apparatuses 50 are bilaterally symmetric. Hereinafter, the detailed configuration of one damper apparatus 50 (the damper apparatus 50 on the left side in FIG. 1) of a pair of the damper apparatuses 50 will be described. As illustrated in FIG. 2, the damper apparatus 50 includes the snap ring 51, which is an example of a stopper, the steered shaft 20, the housing 40, and the shock-absorbing member 60.

As described above, the steered shaft 20 has the shaft portion 21 and the large-diameter portions 24 having a diameter larger than that of the shaft portion 21. In the present embodiment, each large-diameter portion 24 is constituted by a member prepared separately from the shaft portion 21, and is screwed to the end portion of the shaft portion 21 to be fixed to the shaft portion 21 in an integrated manner. As described above, the housing 40, through which the steered shaft 20 extends so as to be movable relative to the housing 40 in the axial direction A, supports the shaft portion 21 of the steered shaft 20. The housing 40 has the restriction portion 42 having the restriction surface 42a facing the end surface 24a of the large-diameter portion 24 in the axial direction A. The restriction surface 42a extends along a plane perpendicular to the axial direction A.

The shock-absorbing member 60 is disposed between the large-diameter portion 24 and the restriction portion 42. When the steered shaft 20 is moved to the end of the movable range relative to the housing 40, the shock-absorbing member 60 restricts relative movement of the steered shaft 20 and absorbs a shock generated due to the restriction. In the present embodiment, the housing 40, which is a fixed member, is provided with the shock-absorbing member 60, and the shock-absorbing member 60 is prevented from coming out of the housing 40 by fitting the snap ring 51 into the snap-ring groove 44 of the housing 40. Thus, in the present embodiment, the large-diameter portion 24 of the steered shaft 20 may function as one member in the invention, and the restriction portion 42 of the housing 40 may function as the other member in the invention.

The shock-absorbing member 60 includes the shock-receiving member 61, the elastic body 62, and a pre-compression spring 63. The shock-receiving member 61 comes into contact with the large-diameter portion 24 when the large-diameter portion 24 is moved to the prescribed position Pr in the axial direction A relative to the restriction portion 42. The shock-receiving member 61 has a tubular portion 61a and a flange portion 61b. The tubular portion 61a has a cylindrical surface facing an inner peripheral surface of the large-diameter-portion accommodating portion 41. The flange portion 61b extends radially outward from an end portion of the tubular portion 61a, and is configured to come into contact with the large-diameter portion 24. The flange portion 61b of the shock-receiving member 61 receives an impact force due to a collision, from the large-diameter portion 24.

The elastic body 62 is disposed between the restriction portion 42 and the shock-receiving member 61. The elastic body 62 is made of a rubber material or a synthetic resin material having rubber-like elasticity. Acrylonitrile-butadiene rubber (hereinafter, referred to as "NBR"), chloroprene rubber, butyl rubber, or ethylene propylene rubber may be preferably used as a material of the elastic body 62 in terms of thermal resistance, cold resistance, and weather resistance. NBR having a polar group or chloroprene rubber may be preferably used as a material of the elastic body 62 in terms of oil resistance.

Figure 3:
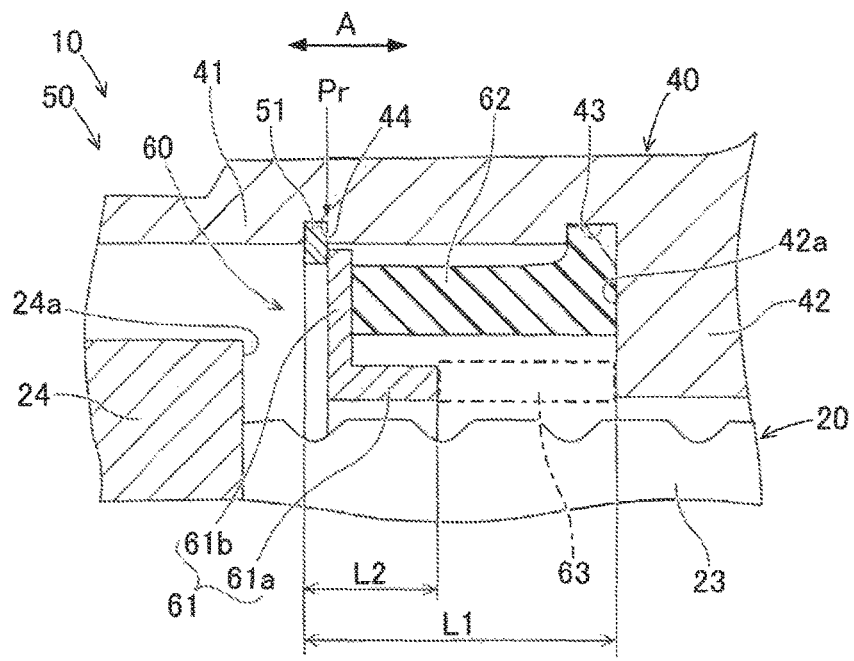
FIG. 3 is an enlarged sectional view illustrating the damper apparatus before occurrence of end contact.

In the present embodiment, the elastic body 62 has a cylindrical shape as a whole, and has an annular protrusion at an end portion of an outer peripheral surface thereof. As illustrated in FIG. 2, the elastic body 62 is fitted to the housing 40 when the annular protrusion thereof is fitted into the annular groove 43 of the housing 40. As illustrated in FIG. 3, the length of the elastic body 62 in the axial direction A is set to be substantially equal to a distance between the restriction surface 42a and an inner surface of the flange portion 61b facing the restriction surface 42a. In a state before occurrence of end contact, that is, in a non-load state where the large-diameter portion 24 has not come into contact with the shock-receiving member 61, the elastic body 62 is hardly deformed and does not apply any urging force to the shock-receiving member 61.

The pre-compression spring 63 is a spring having elasticity in the axial direction A. In the present embodiment, the pre-compression spring 63 is made of a metal material. The pre-compression spring 63 is a coil spring having a cylindrical shape as a whole, and has the same diameter as that of the tubular portion 61a of the shock-receiving member 61. As illustrated in FIG. 3, the pre-compression spring 63 is disposed between the restriction portion 42 and the shock-receiving member 61 in a state where the pre-compression spring 63 is compressed in advance in the axial direction A. That is, the pre-compression spring 63 is compressed by a prescribed pre-compression load in the state before the occurrence of end contact.

In other words, the pre-compression spring 63 urges the shock-receiving member 61 in the axial direction A using an elastic force equal to the above-described pre-compression load in the state before occurrence of end contact. At this time, the shock-receiving member 61 is in a state where an outer peripheral edge of the flange portion 61b is in contact with the snap ring 51 fitted in the snap-ring groove 44 of the housing 40 and movement of the shock-receiving member 61 toward the large-diameter portions 24 in the axial direction A is restricted. In the present embodiment, the prescribed pre-compression load (the set load) is set to a load that is equal to or larger than a difference between a maximum axial force that can be output from the steered shaft 20 by using the rack-and-pinion mechanism (the rack 22 and the pinion 12a) and the steering assist mechanism 30 of the steering system 10 and a maximum axial force required to steer the steered wheels 70.

With the above-described configuration, movement of the shock-receiving member 61 toward the restriction portion 42 is restricted by the elastic force of the pre-compression spring 63, depending on the axial force output from the steered shaft 20 when a driver operates the steering wheel 11 to steer the steered wheels 70. That is, when the axial force of the steered shaft 20 is equal to or less than the set load, relative movement of the large-diameter portion 24 of the steered shaft 20 toward the restriction portion 42 beyond the prescribed position Pr is restricted. Thus, the movable range of the steered shaft 20 that is defined by the set load, that is, the maximum steered angle of the steered wheels 70, is set for end contact during normal steering.

Figure 4:
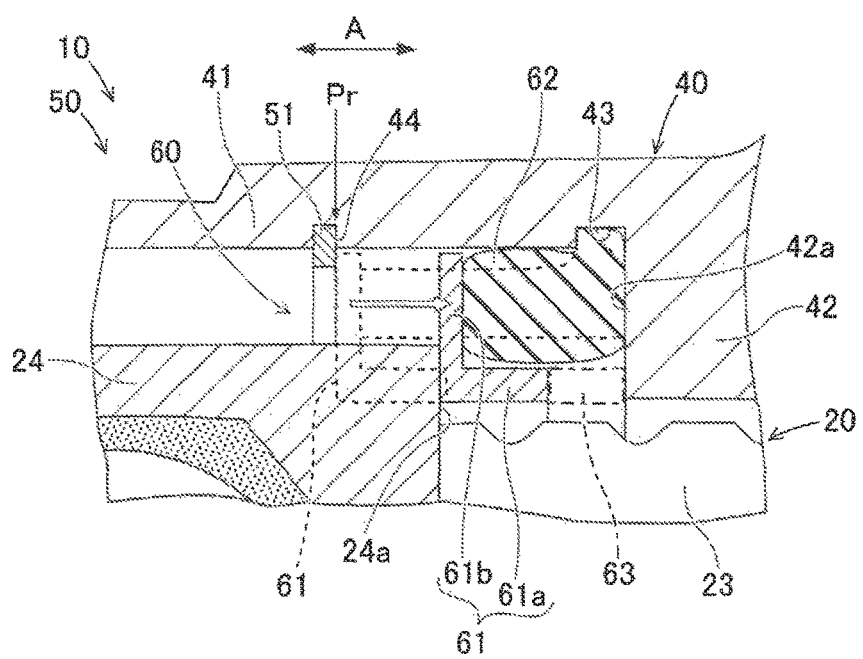
FIG. 4 is an enlarged sectional view illustrating the damper apparatus after occurrence of the end contact.

As illustrated in FIG. 4, when the large-diameter portion 24 moves toward the restriction portion 42 beyond the prescribed position Pr, the pre-compression spring 63 urges the large-diameter portion 24 in the axial direction A via the shock-receiving member 61. That is, when the shock-receiving member 61 receives an axial force exceeding the prescribed pre-compression load from the large-diameter portion 24 after occurrence of the end contact, the pre-compression spring 63 urges the large-diameter portion 24 via the shock-receiving member 61, by using the elastic force corresponding to a moving distance (stroke) of the steered shaft 20 after occurrence of the end contact, in addition to an elastic force equal to the pre-compression load.

When the steered shaft 20 is displaced after occurrence of the end contact, an impact force applied to the shock-receiving member 61 due to contact with the large-diameter portion 24 is transmitted to the elastic body 62. In this way, the elastic body 62 is deformed to absorb a shock when the large-diameter portion 24 is relatively moved toward the restriction portion 42 beyond the prescribed position Pr. The elastic body 62 restricts movement of the steered shaft 20 relative to the housing 40 by applying an elastic force corresponding to the deformation amount to the shock-receiving member 61.

The operation of the damper apparatus 50 will be described with reference to FIG. 3 to FIG. 5. As indicated by a long dashed short dashed line in FIG. 5, the pre-compression spring 63 of the shock-absorbing member 60 in the damper apparatus 50 has a property of exhibiting an elastic force corresponding to an amount of compression from a natural length. As illustrated in FIG. 3, the pre-compression spring 63 is disposed in a state where the pre-compression spring 63 is compressed in the axial direction A in advance at a prescribed pre-compression load Ls. For this reason, when an impact force received by the shock-receiving member 61 due to end contact is equal to or less than the pre-compression load Ls, the shock-receiving member 61 is not displaced in the axial direction A.

On the other hand, when an impact force received by the shock-receiving member 61 due to end contact exceeds the pre-compression load Ls, as illustrated in FIG. 4, the shock-receiving member 61 is displaced in the axial direction A based on the impact force. In an initial state, as indicated by a narrow continuous line in FIG. 5, the elastic body 62 of the shock-absorbing member 60 has a property of exhibiting an elastic force corresponding to a stroke of the shock-receiving member 61 and urging the large-diameter portion 24 via the shock-receiving member 61. For this reason, when the shock-receiving member 61 is displaced, the shock-receiving member 61 is urged by a resultant force (a wide continuous line in FIG. 5) of the elastic force of the elastic body 62 and the elastic force of the pre-compression spring 63.

With the above-described configuration, for example, when the steered wheel 70 collides with an obstacle and an excessive axial force Lx is applied to the steered shaft 20, the damper apparatus 50 stops movement of the steered shaft 20 when the stroke of the shock-receiving member 61 reaches a first stroke S1. Thus, movement of the steered shaft 20 is restricted. The first stroke S1 is shorter than a second stroke S2. The second stroke S2 is a stroke of the shock-receiving member 61 if movement of the steered shaft 20 is restricted only the elastic body 62.

While various materials may be selected as a material of the elastic body 62 made of a rubber material or a synthetic resin material in consideration of thermal resistance or the like, the elastic body 62 is more prone to deterioration than the pre-compression spring 63 made of a metal material. In a case where the elastic body 62 is deformed due to deterioration and the spring constant is decreased as compared with that in the initial stage (narrow dashed line in FIG. 5), even when the excessive axial force Lx is applied to the damper apparatus 50, the shock-receiving member 61 is urged by a resultant force (wide dashed line in FIG. 5) of the elastic force of the deteriorated elastic body 62 and the elastic force of the pre-compression spring 63, and movement of the steered shaft 20 can be stopped when the stroke of the shock-receiving member 61 reaches a third stroke S3.

In the present embodiment, the pre-compression load Ls applied to the pre-compression spring 63 is managed based on a spring constant of the pre-compression spring 63 and a length of the pre-compression spring 63 in the axial direction A in an initial state where the pre-compression spring 63 is installed. Specifically, the spring constant, the length of the shock-receiving member 61 and the position of the snap-ring groove 44 are set such that the prescribed pre-compression load Ls is achieved when the pre-compression spring 63 is compressed to a length equal to a difference (L1-L2) between a distance L1 in the axial direction A from the restriction surface 42a of the restriction portion 42 of the housing 40 to a groove side surface, on one side (the left side in FIG. 3), of the snap-ring grooves 44 and a distance L2 corresponding to the sum of the thickness of the snap ring 51 and the length of the shock-receiving member 61 in the axial direction A.

In order to restrict movement of the steered shaft 20 to a prescribed stroke or less even when the excessive axial force Lx is input into the steered shaft 20, the spring constant of the elastic body 62 and the spring constant of the pre-compression spring 63 are preferably set to be higher. However, the shock absorbing property deteriorates as the spring constant of the elastic body 62 and the spring constant of the pre-compression spring 63 are set to be higher. This causes a possibility that the steered shaft 20 and an internal mechanism of the steering system 10 will be suddenly stopped due to end contact, and a high load will be applied to the internal mechanism. In addition, an elastic force with respect to a compression amount is increased as the spring constant of the pre-compression spring 63 is set to be higher. This causes a possibility that management of the pre-compression load Ls based on the length at the time of installation will be difficult.

Figure 5:
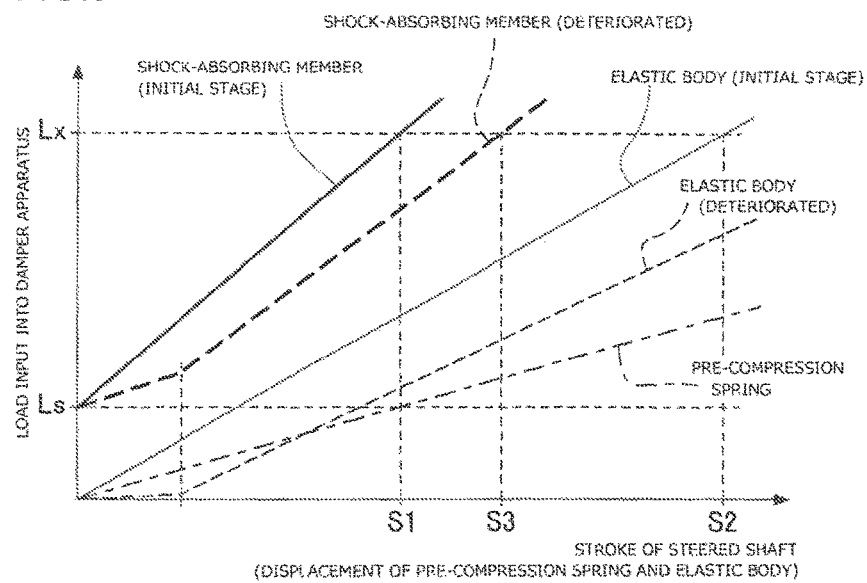
FIG. 5 is a graph illustrating the relationship between the load applied to the damper apparatus after occurrence of the end contact and the stroke of a large-diameter portion of a shaft.

In contrast to this, in the present embodiment, as illustrated in FIG. 5, the spring constant of the pre-compression spring 63 is set to be lower than the spring constant of the elastic body 62, so that management of the pre-compression load Ls is facilitated. In addition, the pre-compression spring 63 is installed in a pre-compressed state. Thus, the movable range of the steered shaft 20 is set such that the shock-receiving member 61 is not displaced when the input into the steered shaft 20 is equal to or less than the pre-compression load Ls (set load). When the excessive axial force Lx is input into the steered shaft 20, movement of the steered shaft 20 is stopped when a moving distance equal to or longer the first stroke S1 is achieved. In this way, movement of the steered shaft 20 is restricted while a shock is absorbed.

In the present embodiment, the shock-absorbing member 60 of the damper apparatus 50 is installed by providing the shock-receiving member 61, the elastic body 62, and the pre-compression spring 63 in the large-diameter-portion accommodating portion 41 of the housing 40 and fitting the snap ring 51 into the snap-ring groove 44 in a state where the shock-receiving member 61 is pushed such that the length of the pre-compression spring 63 becomes a prescribed length. Instead of this configuration, there may be employed a configuration in which the shock-receiving member 61, the elastic body 62, the pre-compression spring 63, and the snap ring 51 are unitized and disposed in the large-diameter-portion accommodating portion 41 of the housing 40.

Figure 6:
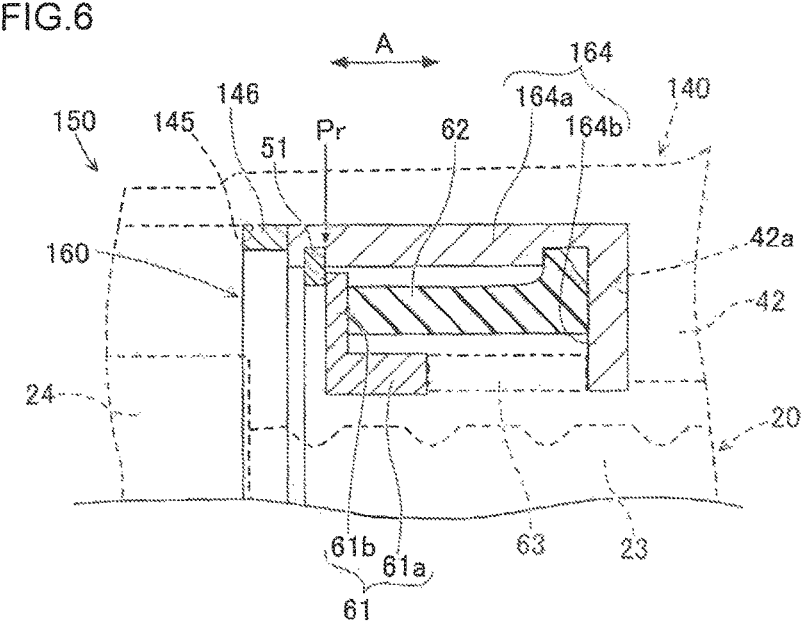
FIG. 6 is an enlarged sectional view illustrating the configuration of a unitized damper apparatus in a modified example of the embodiment.

Specifically, as illustrated in FIG. 6, a shock-absorbing member 160 of a damper apparatus 150 includes a main body 164, the snap ring 51, the shock-receiving member 61, the elastic body 62, and the pre-compression spring 63. The main body 164 has a tubular portion 164a fitted to a cylindrical inner surface of a housing 140, and a support portion 164b configured to support one end of the pre-compression spring 63 in the axial direction A. The snap ring 51 is fixed to an annular snap-ring groove defined in an inner peripheral surface of the tubular portion 164a. Thus, the snap ring 51 restricts movement of the shock-receiving member 61 toward the large-diameter portion 24.

The main body 164, the shock-receiving member 61, the elastic body 62, the pre-compression spring 63, and the snap ring 51 constitute a unit configured to maintain a state where the pre-compression spring 63 is compressed in advance between the support portion 164b and the shock-receiving member 61. The unit is installed so as to be detachable from the restriction portion 42. The shock-absorbing member 160 unitized in this way is disposed at a position at which the main body 164 comes into contact with the restriction surface 42a of the restriction portion 42 of the housing 140.

The shock-absorbing member 160 is fixed inside the housing 140, for example, when a fixed member 146 having an external thread on its outer periphery is fastened to an internal thread 145 provided in an inner peripheral surface of the housing 140. Alternatively, the shock-absorbing member 160 may be fixed inside the housing 140, for example, when the outer peripheral surface of the main body 164 is press-fitted to the inner peripheral surface of the housing 140. Further alternatively, an external thread that can be fastened to the internal thread 145 may be provided at a portion of the outer peripheral surface of the main body 164, and the shock-absorbing member 160 may be fixed inside the housing 140 by fastening the external thread to the internal thread.

In the foregoing embodiment and the modified example, the shock-absorbing member 60, 160 may be a member configured to be deformed in response to an impact force received by the shock-receiving member 61, thereby restricting movement of the steered shaft 20 while absorbing a shock. Alternatively, the shock-absorbing member 60, 160 may be a volume compression-type member in which the elastic body 62 is disposed in an accommodating chamber the volume of which is varied in response to the stroke of the shock-absorbing member 60. With this configuration, the volume compression-type member achieves a high movement restricting force.

Specifically, when a volume compression-type member is employed as the shock-absorbing member 60, an accommodating chamber having a prescribed airtightness is defined by the inner peripheral surface of the housing 40, the outer peripheral surface of the tubular portion 61*a* of the shock-receiving member 61 facing the inner peripheral surface of the housing 40 in the radial direction, the restriction surface 42*a* of the restriction portion 42, and the inner surface of the flange portion 61*b* facing the restriction surface 42*a* in the axial direction A. The volume of the accommodating chamber is increased or decreased in response to the stroke of the shock-receiving member 61. When the elastic body 62 is disposed in the accommodating chamber, a large urging force is applied to the shock-receiving member 61 as the volume of the accommodating chamber is decreased to a value close to the volume of a non-compressive elastic body. The urging force serves as a movement restricting force, and thus movement of the steered shaft 20 can be restricted while a shock is absorbed.

In the foregoing embodiment and the modified example, the elastic body 62 of the shock-absorbing member 60, 160 is made of a rubber material or a synthetic resin material having rubber-like elasticity. Alternatively, the elastic body 62 may be made of various materials having elasticity in the axial direction A. For example, the elastic body 62 may be a coil spring made of a metal material, like the pre-compression spring 63.

When an expected excessive axial force Lx can be coped with by the elastic force of the pre-compression spring 63, the shock-absorbing member 60 need not include the elastic body 62. The pre-compression spring 63 may have various configurations as long as the pre-compression spring 63 has elasticity in the axial direction A and the pre-compression spring 63 can be installed in a pre-compressed state. As the pre-compression spring 63, for example, a disc spring may be employed instead of the coil spring described in the embodiment, as long as the pre-compression spring 63 is made of a metal material. Alternatively, the pre-compression spring 63 may be made of a rubber material or the like, instead of a metal material.

In the foregoing embodiment and the modified example, the housing 40, 140, which is a fixed member, is provided with the shock-absorbing member 60, 160. Alternatively, the steered shaft 20, which is a moving member, may be provided with the shock-absorbing member 60, 160. In this configuration, the shock-absorbing member 60, 160 is disposed next to the large-diameter portion 24 of the steered shaft 20 in the axial direction A.

The shock-receiving member 61 comes into contact with the restriction portion 42 of the housing 40 when the large-diameter portion 24 is moved to the prescribed position Pr in the axial direction A relative to the restriction portion 42 and end contact occurs. In this configuration, the pre-compression spring 63 is disposed between the end surface 24*a* of the large-diameter portion 24 and the shock-receiving member 61 in the axial direction A, in a state where the pre-compression spring 63 is compressed in advance. That is, in this configuration, the restriction portion 42 of the housing 40 may function as one member in the invention and the large-diameter portion 24 of the steered shaft 20 may function as the other member in the invention.

Figure 7:
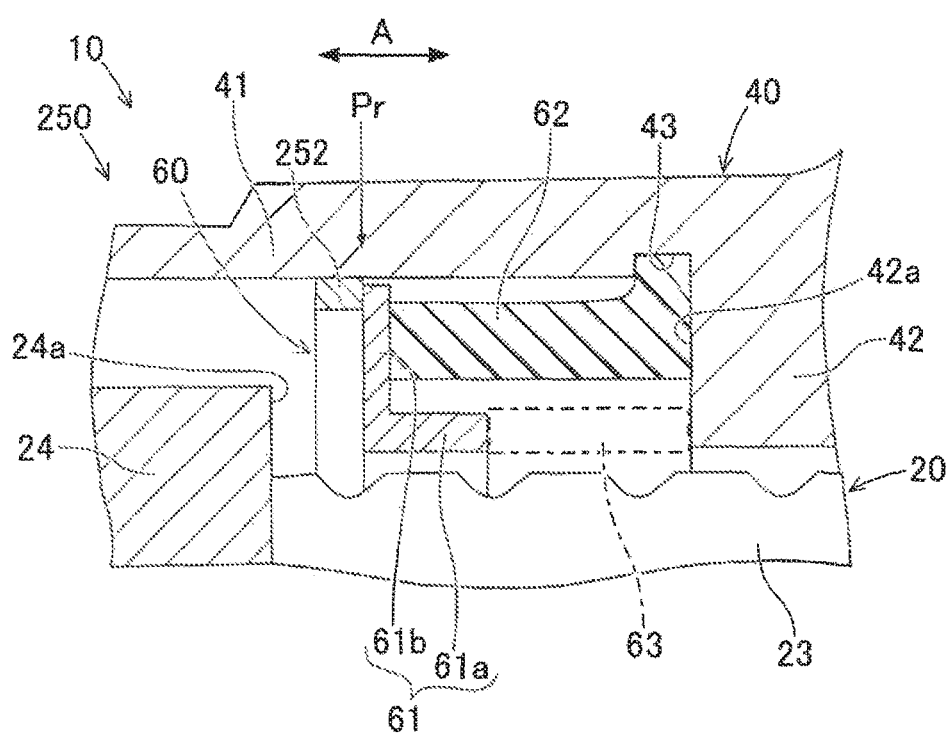
FIG. 7 is an enlarged sectional view illustrating the configuration of a damper apparatus including a different type of a stopper in a modified example of the embodiment.

In the foregoing embodiment and the modified example, the damper apparatus 50, 150 includes the snap ring 51 serving as a stopper and fitted into the snap-ring groove 44. Alternatively, various configurations may be employed as long as movement of the shock-receiving member 61 toward the large-diameter portion 24 can be restricted. For example, as illustrated in FIG. 7, a damper apparatus 250 includes a ring member 252 configured to be fixed, through press-fitting, to the inner peripheral surface of the housing 40. When the ring member 252 is press-fitted to a prescribed position in the axial direction A, the shock-receiving member 61 comes into contact with an end surface of the ring member 252 to restrict movement of the shock-receiving member 61 toward the large-diameter portion 24. Alternatively, for example, a ring-shaped fixed member serving as a stopper is screwed and fastened to the housing 40.

In the foregoing embodiment and the modified example, the damper apparatus 50, 150 is applied to the steering system 10 of the vehicle. Alternatively, the damper apparatus 50, 150 may be applied to any apparatus that includes a shaft and a housing through which the shaft extends so as to be movable relative to the housing in an axial direction, and in which end contact may occur. In this configuration, a pre-compression load at the time of installation of the pre-compression spring 63 is appropriately set based on, for example, a maximum axial force applied to the shaft.

The damper apparatus 50, 150 includes: the steered shaft 20 having the shaft portion 21 and the large-diameter portion 24 having a diameter larger than that of the shaft portion 21; the housing 40 through which the steered shaft 20 extends so as to be movable relative to the housing 40 in the axial direction A, the housing 40 having a tubular shape, and the housing 40 having the restriction portion 42 at a position at which the restriction portion 42 faces the large-diameter portion 24 in the axial direction A; and the shock-absorbing member 60, 160 disposed between the large-diameter portion 24 and the restriction portion 42, the shock-absorbing member 60, 160 being configured to restrict movement of the steered shaft 20 relative to the housing 40 and absorb a shock generated due to the restriction when the steered shaft 20 is moved to an end of a movable range relative to the housing 40. The shock-absorbing member 60, 160 includes: the shock-receiving member 61 configured to come into contact with one member when the large-diameter portion 24 is moved to a prescribed position in the axial direction A relative to the restriction portion 42, the one member being one of the large-diameter portion 24 and the restriction portion 42; and the pre-compression spring 63, the pre-compression spring being a spring having elasticity in the axial direction A, the pre-compression spring 63 being disposed between the shock-receiving member 61 and the other member in a state where the pre-compression spring 63 is compressed in advance in the axial direction A, and the pre-compression spring 63 being configured to urge the one member in the axial direction A via the shock-receiving member 61 when the large-diameter portion 24 is relatively moved toward the restriction portion 42 beyond the prescribed position, the other member being the other one of the large-diameter portion 24 and the restriction portion 42.

With this configuration, the pre-compression spring 63 constituting the shock-absorbing member 60, 160 is disposed in a state where the pre-compression spring 63 is compressed in advance by the pre-compression load Ls, and the shock-receiving member 61 is maintained in a state where the shock-receiving member 61 is constantly urged toward the one member (the large-diameter portion 24 in the foregoing embodiment). Thus, when the load in the axial direction A applied to the damper apparatus 50, 150 is lower than the pre-compression load Ls for compressing the pre-compression spring 63, displacement of the shock-receiving member 61 in the axial direction A is restricted by the elastic force of the pre-compression spring 63. As a result, regarding end contact during normal steering, the position in the axial direction A, at which the end contact occurs, is prevented from varying, and the movable range of the steered shaft 20 is appropriately maintained. When the large-diameter portion 24 of the steered shaft 20 is relatively moved toward the restriction portion 42 beyond the prescribed position, that is, when a load higher than the pre-compression load Ls is applied to the damper apparatus 50, 150 due to end contact during abnormal steering, the pre-compression spring 63 of the shock-absorbing member 60, 160 urges the one member in the axial direction A via the shock-receiving member 61. At this time, the one member is urged by an elastic force corresponding to the length to which the pre-compression spring is compressed in advance, in addition to an elastic force corresponding to a stroke of the steered shaft 20 after occurrence of the end contact. With this configuration, it is possible to reliably restrict movement of the steered shaft 20 while appropriately maintaining the shock absorbing property, by appropriately adjusting the spring constant and the pre-compressed amount of the pre-compression spring 63.

The shock-absorbing member 60, 160 further includes the elastic body 62 disposed between the other member and the shock-receiving member 61 and made of a rubber material or a synthetic resin material having rubber-like elasticity. When the large-diameter portion 24 is relatively moved toward the restriction portion 42 beyond the prescribed position, the elastic body 62 is deformed to absorb a shock while restricting relative movement of the shaft (the steered shaft 20). With this configuration, the damper apparatus 50, 150 can absorb a shock while restricting relative movement of the steered shaft 20, by using the elastic force of the elastic body 62 that is deformed based on the stroke of the steered shaft 20 after occurrence of end contact, in addition to the elastic force of the pre-compression spring 63. The damper apparatus 50, 150 includes two different elastic members (the pre-compression spring 63 and the elastic body 62). Thus, the main function of the pre-compression spring 63 may set to a function of maintaining the movable range of the steered shaft 20, and the main function of the elastic body 62 may be set to a function of restricting movement of the steered shaft 20 and absorbing a shock. Thus, when the spring constants and so forth of the pre-compression spring 63 and the elastic body 62 are respectively set based on their main functions, restriction of movement of the steered shaft 20 and shock absorption can be appropriately performed by the elastic body 62. Even when the elastic body 62 made of a rubber material or a synthetic resin material having rubber-like elasticity deteriorates, for example, over time, the shock-receiving member 61 is constantly urged toward the one member (the large-diameter portion 24 in the foregoing embodiment) by the pre-compression spring 63, and thus the movable range of the steered shaft 20 is appropriately maintained.

The pre-compression spring 63 is made of a metal material. With this configuration, because the pre-compression spring 63 is made of a metal material, the environmental resistance of the pre-compression spring 63 is made higher than that in the configuration in which the pre-compression spring 63 is made of a rubber material or the like. Thus, it is possible to maintain the state where the shock-receiving member 61 is constantly urged toward the one member by the pre-compression load Ls. Thus, the movable range of the steered shaft 20 of the damper apparatus 50, 150 can be maintained, and operations of the damper apparatus 50, 150 and the steering system can be further stabilized.

The housing 40 is provided with the shock-absorbing member 60, 160. The shock-receiving member 61 comes into contact with the large-diameter portion 24, which may function as the one member, when the large-diameter portion 24 is moved to the prescribed position relative to the restriction portion 42. The pre-compression spring 63 is disposed between the restriction portion 42, which may function as the other member, and the shock-receiving member 61. In this configuration, the housing, which is a fixed member, is provided with the shock-absorbing member 60, 160. Thus, the steered shaft 20, which is a moving member, can be reduced in weight, a shock generated due to end contact can be reduced, and operability of the steered shaft 20 can be improved.

The damper apparatus 50 further includes the stopper (the snap ring 51) fixed to the housing 40 and configured to restrict movement of the shock-receiving member 61 toward the one member. With this configuration, the distance (L1-L2) between the restriction portion 42 and the shock-receiving member 61 in a state where movement thereof is restricted by the snap ring 51 can be kept constant. Thus, the pre-compression spring 63 can be disposed between the restriction portion 42 and the shock-receiving member 61 in a state where the pre-compression spring 63 is compressed by the prescribed pre-compression load Ls. As a result, it is possible to restrict relative movement of the steered shaft 20 and appropriately maintain the movable range of the steered shaft 20, in a case of end contact during normal steering, in which the axial force of the steered shaft 20 is equal to or lower than the pre-compression load Ls.

In the modified example of the foregoing embodiment, the shock-absorbing member 160 further includes the main body 164 having the tubular portion 164a and the support portion 164b configured to support one end of the pre-compression spring 63 in the axial direction A, and the stopper (the snap ring 51) fixed to the tubular portion 164a and configured to restrict movement of the shock-receiving member 61 toward the one member. The main body 164, the shock-receiving member 61, the pre-compression spring 63, and the stopper (the snap ring 51) constitute a unit disposed detachably from the other member and configured to maintain a state where the pre-compression spring 63 is compressed between the support portion 164b and the shock-receiving member 61. In this configuration, the shock-absorbing member 160 includes the unit configured to maintain a state where the pre-compression spring 63 is compressed in advance. Thus, it is possible to convey these components in the form of a unit. The pre-compression spring 63 can be installed in a state where the pre-compression spring 63 is compressed by an appropriate load, by disposing the unit between the restriction portion 42 and the large-diameter portion 24. As a result, the assembly of the damper apparatus 150 can be facilitated and thus the manufacturing cost can be reduced.

The steering system 10 includes the damper apparatus 50, 150. In the steering system 10, the movable range of the steered shaft 20 needs to be set in advance such that interference between the steered wheel and the tire house cover and so forth does not occur, and the movable range is required not to vary over time. In some cases, the excessive axial force Lx is input into the steered shaft 20 of the steering system 10 due to, for example, a collision of the steered wheel with a curbstone. Thus, movement of the steered shaft 20 is required to be reliably restricted. Therefore, it is particularly useful to apply, to the steering system 10, the damper apparatus 50, 150 configured to appropriately maintain the movable range of the steered shaft 20, and configured to restrict movement of the steered shaft 20 while exhibiting a high shock absorbing property.

The steered shaft 20 is provided with the rack-and-pinion mechanism (the rack 22 and the pinion 12a) to which an operation of the steering wheel 11 is transmitted. The pre-compression spring 63 is compressed in advance by a load equal to or larger than a difference between the maximum axial force that can be output by the steered shaft 20 of the steering system 10 and the maximum axial force required to steer the steered wheels. With this configuration, the pre-compression load Ls applied when the pre-compression spring 63 is compressed in advance is set to a load equal to or larger than the difference between the maximum axial force that is allowed to be output from the steered shaft by the rack-and-pinion mechanism and the steering assist mechanism and the maximum axial force required to steer the steered wheels. That is, movement of the shock-receiving member 61 toward the other member (the restriction portions 42 in the foregoing embodiment) is restricted by the elastic force of the pre-compression spring 63, depending on the axial force (the set load) input into the steered shaft 20 when the driver operates the steering wheel 11 to steer the steered wheels. Therefore, relative movement of the large-diameter portion 24 of the steered shaft 20 toward the restriction portion 42 beyond the prescribed position is restricted, depending on the set load. As a result, the movable range of the steered shaft 20 defined by the set load can be appropriately set.

What is claimed is:

1. A damper apparatus comprising:
    a shaft having a shaft portion and a large-diameter portion having a diameter larger than a diameter of the shaft portion;
    a housing through which the shaft extends so as to be movable relative to the housing in an axial direction, the housing having a tubular shape, and the housing having a restriction portion at a position at which the restriction portion faces the large-diameter portion in the axial direction; and
    a shock-absorbing member disposed between the large-diameter portion and the restriction portion, the shock-absorbing member being configured to restrict movement of the shaft relative to the housing and absorb a shock generated due to the restriction when the shaft is moved to an end of a movable range relative to the housing, wherein
    the shock-absorbing member includes:
        a shock-receiving member configured to come into contact with one member when the large-diameter portion is moved to a prescribed position in the axial direction relative to the restriction portion, the one member being one of the large-diameter portion and the restriction portion;
        a pre-compression spring, the pre-compression spring being a spring having elasticity in the axial direction, the pre-compression spring being disposed between the shock-receiving member and another member in a state where the pre-compression spring is compressed in advance in the axial direction, and the pre-compression spring being configured to urge the one member in the axial direction via the shock-receiving member when the large-diameter portion is relatively moved toward the restriction portion beyond the prescribed position, the another member being the other one of the large-diameter portion and the restriction portion; and
        an elastic body disposed between the another member and the shock-receiving member, the elastic body being configured to be deformed to absorb a shock while restricting relative movement of the shaft when the large-diameter portion is relatively moved toward the restriction portion beyond the prescribed position.

2. The damper apparatus according to claim 1, wherein the pre-compression spring is made of a metal material.

3. The damper apparatus according to claim 1, wherein:
    the shock-absorbing member is installed in the housing;
    the shock-receiving member is configured to come into contact with the large-diameter portion that is the one member when the large-diameter portion is moved to the prescribed position relative to the restriction portion; and
    the pre-compression spring is disposed between the shock-receiving member and the restriction portion that is the another member.

4. The damper apparatus according to claim 3, further comprising a stopper fixed to the housing, the stopper being configured to restrict movement of the shock-receiving member toward the one member.

5. The damper apparatus according to claim 1, wherein the shock-absorbing member further includes:
    a main body having a tubular portion and a support portion configured to support one end of the pre-compression spring in the axial direction; and
    a stopper fixed to the tubular portion, the stopper being configured to restrict movement of the shock-receiving member toward the one member, and
    the main body, the shock-receiving member, the pre-compression spring, and the stopper constitute a unit configured to maintain a state where the pre-compression spring is compressed between the support portion and the shock-receiving member, the unit being disposed in the another member so as to be detachable from the another member.

6. A steering system comprising the damper apparatus according to claim 1, wherein
    the shaft constitutes a steered shaft connected at respective end portions to steered wheels via tie rods, the steered shaft being configured to make a reciprocating motion in an axial direction to steer the steered wheels, the shaft being oscillatably connected at the large-diameter portion to each of the tie rods, and
    the steered shaft is accommodated in the housing.

7. The steering system according to claim 6, wherein:
    the steered shaft is provided with a rack-and-pinion mechanism to which an operation of a steering wheel is transmitted; and
    the pre-compression spring is compressed in advance by a load that is equal to or larger than a difference between a maximum axial force that is able to be output from the steered shaft of the steering system and a maximum axial force required to steer the steered wheels.

* * * * *